United States Patent
Xu et al.

(10) Patent No.: US 9,680,610 B2
(45) Date of Patent: Jun. 13, 2017

(54) METHOD AND APPARATUS FOR ERROR CONTROL IN 3D VIDEO TRANSMISSOIN

(71) Applicant: THOMSON LICENSING, Issy de Moulineaux (FR)

(72) Inventors: Yan Xu, Beijing (CN); Lin Du, Beijing (CN); Jianping Song, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 93 days.

(21) Appl. No.: 14/443,770

(22) PCT Filed: Dec. 13, 2012

(86) PCT No.: PCT/CN2012/086522
§ 371 (c)(1),
(2) Date: May 19, 2015

(87) PCT Pub. No.: WO2014/089798
PCT Pub. Date: Jun. 19, 2014

(65) Prior Publication Data
US 2015/0312003 A1    Oct. 29, 2015

(51) Int. Cl.
*H04L 1/18*    (2006.01)
*H04L 1/08*    (2006.01)
*H04L 1/16*    (2006.01)

(52) U.S. Cl.
CPC .............. *H04L 1/08* (2013.01); *H04L 1/1607* (2013.01); *H04L 1/188* (2013.01); *H04L 1/1809* (2013.01)

(58) Field of Classification Search
None
See application file for complete search history.

(56) References Cited

U.S. PATENT DOCUMENTS

| 5,629,948 | A | 5/1997 | Hagiwara et al. |
| 6,377,257 | B1 | 4/2002 | Borrel et al. |
| 6,850,769 | B2 | 2/2005 | Grob et al. |
| | | (Continued) | |

FOREIGN PATENT DOCUMENTS

| CN | 1798009 | 7/2006 |
| CN | 101355707 | 8/2010 |
| | (Continued) | |

OTHER PUBLICATIONS

Annamalai et al., "Analysis and Optimization of Adaptive Multicopy Transmission ARQ Protocols for Time-Varying Channels," IEEE Tranactions on Communications, 46 (10), pp. 1356-1368, Oct. 1998.

*Primary Examiner* — Daniel McMahon
(74) *Attorney, Agent, or Firm* — Brain J. Dorini; Ivonete Markman

(57) ABSTRACT

Methods and apparatuses for error control in 3D video transmission over wireless network are described. Cooperative Automatic Repeat re Quest(ARQ) is disclosed, which is based on the selective repeat ARQ with consideration of two factors: one is the interdependent relationship between the multiple components of the 3D video, e.g. the 2D video and its depth information in the 2D-plus-Depth format; and the other is time constraints of video frames/packets for continuous video playback. The disclosed cooperative ARQ allows the sender to control ARQ strength adaptively on a per-frame/per-packet basis.

16 Claims, 2 Drawing Sheets

(a)

(b)

(56) References Cited

U.S. PATENT DOCUMENTS

| | | | |
|---|---|---|---|
| 7,631,239 B2 | 12/2009 | Yeo et al. | |
| 8,185,792 B2* | 5/2012 | Suneya | H04L 1/0021 |
| | | | 714/748 |
| 2002/0154600 A1* | 10/2002 | Ido | H04L 1/1809 |
| | | | 370/216 |
| 2003/0101387 A1 | 5/2003 | Lee | |
| 2004/0027991 A1* | 2/2004 | Jang | H04L 1/1671 |
| | | | 370/230 |
| 2006/0267992 A1* | 11/2006 | Kelley | G06F 9/30069 |
| | | | 345/502 |
| 2007/0116277 A1* | 5/2007 | Ro | H04N 7/167 |
| | | | 380/201 |
| 2008/0031391 A1 | 2/2008 | Roh et al. | |
| 2009/0210765 A1* | 8/2009 | Henocq | H04L 1/1806 |
| | | | 714/748 |
| 2010/0223523 A1 | 9/2010 | Dinan et al. | |
| 2010/0290483 A1 | 11/2010 | Park et al. | |
| 2012/0002103 A1* | 1/2012 | Shao | H04N 21/43637 |
| | | | 348/388.1 |
| 2015/0200750 A1* | 7/2015 | Lu | H04L 1/1671 |
| | | | 370/252 |
| 2015/0222361 A1* | 8/2015 | Dhaini | H04L 12/6418 |
| | | | 398/66 |

FOREIGN PATENT DOCUMENTS

| | | |
|---|---|---|
| CN | 101888561 | 11/2010 |
| EP | 2357823 | 8/2011 |
| JP | 2011091763 | 5/2011 |

\* cited by examiner

METHOD AND APPARATUS FOR ERROR CONTROL IN 3D VIDEO TRANSMISSOIN

This application claims the benefit, under 35 U.S.C. §365 of International Application PCT/CN2012/086522 filed Dec. 13, 2012 which was published in accordance with PCT Article 21(2) on Jun. 19, 2014 in English.

TECHNICAL FIELD

The present invention generally relates to error control for data transmission. More particularly, it relates to error control for 3D video transmission.

BACKGROUND OF THE INVENTION

Streaming 3D video over a wireless network is a very challenging task due to the highly variable nature of wireless networks. Packets may be dropped during transmission or may only reach the destination after a significant delay. One of the crucial limitations of wireless networks is related to the high Bit Error Rate (BER) on the radio link. In order to counteract high BERs, most of the wireless network technologies employ Automatic Repeat reQuest (ARQ).

ARQ (Automatic Repeat reQuest), also known as Automatic Repeat Query, is an error-control method for data transmission. In conventional ARQ schemes, packet errors are examined at the receiver by an error detection code, usually cyclic redundancy checks (CRC). If the packet is received successfully, the receiver sends an acknowledgement (ACK) of the successful transmission to the receiver. If the receiver detects an error in the packet, it sends a negative acknowledgement (NACK) request for re-transmission of that packet.

If the sender does not receive an ACK before a timeout, which is a period of allowed lapse time before an acknowledgement is to be received, or if it receives a NACK, it usually re-transmits the packet until an ACK is received or a predefined number of re-transmissions are reached.

The basic ARQ schemes include stop-and-wait ARQ, Go-Back-N ARQ, and selective repeat ARQ.

Stop-and-wait ARQ is inefficient compared with other ARQs, because the sender does not send any further packets until it receives an ACK signal. To solve this problem, one can pick a window, and send the set of packets falling inside the window one by one before an earlier packet is acknowledged and use one ACK signal for each packet. This is the basic idea of go-back-N ARQ and the selective repeat ARQ.

Go-back-N ARQ uses a window mechanism where the sender can send packets that fall within a window. The window advances as acknowledgements for earlier packets are received. The receiver receives packets in order and cannot accept packets out of sequence. Go-back-N ARQ uses network connection more efficiently than stop-and-wait ARQ. Instead of waiting for an acknowledgement for every packet, the connection is utilized as the set of packets within the window are sent. However, this method also results in sending packets multiple times—if any packet is lost or damaged, or the ACK signal acknowledging them is lost or damaged, that packet and all following packets falling in the window will be re-sent, even if they were received without error. To avoid this, selective repeat ARQ can be used.

Unlike go-back-N ARQ, the receiving process of selective repeat ARQ will continue to accept and acknowledge packets sent after an initial error. The receiver acknowledges each successfully received packet by transmitting an ACK bearing the sequence number of the packet being acknowledged. If an ACK is not received for a packet before the expiration of the timeout, the packet is retransmitted. Once a packet has been retransmitted the transmitter resumes transmission of packets from where it left off.

Various schemes exist that mitigate the effects of errors during transmission of 2D video data. However, the transmission of 3D video data has not been investigated in the art with consideration of 3D video characteristics.

SUMMARY OF THE INVENTION

This invention is directed to methods and apparatuses for error control in 3D video transmission.

According to an aspect of the present invention, there is provided a method for controlling errors during data transmission, wherein the data to be transmitted comprise two interrelated components. The method comprises transmitting a first packet of a first component and a second packet of a second component of the data separately; determining a re-transmission probability for the second packet based on a transmission status of the first packet; and re-transmitting the second packet with the re-transmission probability for the second packet.

According to another aspect of the present invention, there is provided an apparatus for controlling errors during data transmission, wherein the data to be transmitted comprise two interrelated components. The apparatus comprises a normal transmission unit for transmitting a first packet of a first component and a second packet of a second component of the data separately; a re-transmission determination unit for generating a re-transmission request for the second packet based on a transmission status of the first packet; and a re-transmission unit for re-transmitting the second packet upon receiving the re-transmission request.

BRIEF DESCRIPTION OF THE DRAWINGS

The above features of the present invention will become more apparent by describing in detail exemplary embodiments thereof with reference to the attached drawings in which.

DETAILED DESCRIPTION

This invention provides a method for error control in 3D video transmission over wireless networks. 3D video can take various formats such as 2D-plus-Depth, stereo format with left and right views, multi-view, 2D-plus-Delta format etc. The common feature of these 3D video formats is that there are multiple components/files in a 3D video file, and there is a one to one correspondence between these multiple components/files. For example, the 2D-plus-Depth format has a 2D video component/file and a depth map component/file, and one frame of the 2D video corresponds to one frame of the depth map. The stereo format has a left view video component/file and a right view video component/file, and one frame in the left view has a corresponding frame in the right view.

In the following, 2D-plus-Depth is used as an example 3D video format. The same principles apply to other 3D video formats. 2D-plus-Depth is one popular format for representing 3D video, wherein a 2D video is supplemented with a depth map. The depth map represents the per pixel distance from the camera and can be used to render 3D video at the user's terminal. This format is attractive since the inclusion of depth enables a display-independent solution for 3D. It allows adjustment of depth perception in stereo displays according to viewing characteristics such as display size and viewing distance. Moreover, it is backward compatible with legacy 2D set-top boxes and is display format independent. Transmitting 2D video and depth information in two different logical channels provides flexibility to viewers. For example, a viewer who has only a 2D decoder only needs to receive 2D video and views the 2D video normally. He/she can choose whether to receive the associated depth information or not, which cannot be achieved if 2D video and the depth map are multiplexed. Here logical channels refer to the channels where data can be received separately, including through non-physical methods, e.g. through different IP multicast addresses.

This invention provides an error control method for 3D video transmission, called "cooperative ARQ". It is based on the selective repeat ARQ with consideration of two factors. One is the interdependent/interrelated relationship between the multiple components of the 3D video, i.e. the 2D video and its depth information in the 2D-plus-Depth format. The other is time constraints for continuous video playback. It allows the sender (or a mobile terminal) to control ARQ strength adaptively on a per-frame or per-packet basis. It guarantees continuous playback of the 3D video and efficient use of network connections.

During the transmission of the 3D video, both 2D video data and depth data are put into packets with one packet of 2D video data corresponding to one packet of depth data. Depending on the applications, one packet may have a size smaller or larger than one frame of the 2D video and the depth map.

Figure 1:
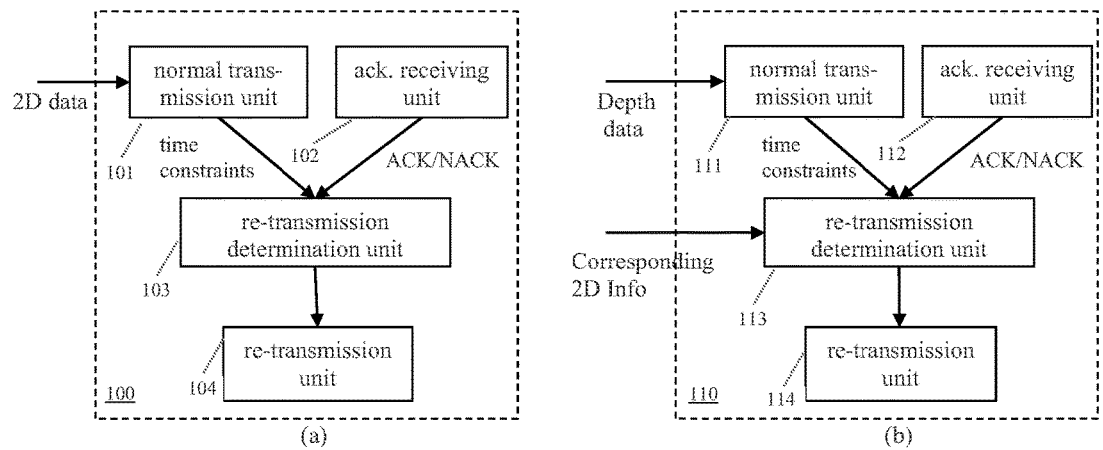
FIG. 1 shows exemplary cooperative ARQ modules according to an embodiment of the present invention: (a) 2D ARQ module; and (b) Depth ARQ module.

FIG. 1 illustrates cooperative ARQ modules according to one embodiment of the present invention. It comprises a 2D ARQ module 100 and a depth ARQ module 110. Each of the two ARQ modules comprises a normal transmission unit (101 and 111) for transmitting packets of the corresponding data, i.e. 2D video (101) or the depth map (111), an acknowledgement receiving unit (102 and 112) for receiving the ACK or NACK signals for the sent packets, a re-transmission determination unit (103 and 113) for generating a re-transmission request for sent packets based on a transmission status of sent packets and a time constraint, and a re-transmission unit (104 and 114) for re-transmitting packets upon receiving a re-transmission request.

In a different embodiment, the corresponding units for the two ARQ modules can be combined. For example, one transmission unit is used for transmitting packets of both 2D video and depth map. One acknowledgement receiving unit is employed to receive ACK or NACK signals for the sent packets. One re-transmission determination unit is utilized to generate separate re-transmission requests for 2D video and depth information; and one re-transmission unit is used to re-transmit the required packet upon receiving the re-transmission request.

In one embodiment, the normal transmission of the 2D video and depth map are performed separately. There may be some offset between the transmission start time for a 2D packet and that for a corresponding depth packet. In one implementation, the start time of 2D packets may be earlier than that of depth packets so that the 2D packet transmission status can be used to determine the depth packet's re-transmission. Note that a large offset may lead to extra delay of the 3D content playback because of the delayed depth map transmission. Thus, when selecting the offset, there is a tradeoff between the 3D content playback delay and the re-transmission efficiency. In one embodiment, the offset could be selected to be close to the average round-trip time of a packet plus some adjustment time. Thus when a depth packet is transmitted, it is very likely that the acknowledgement signal of its corresponding 2D packet has been received, which may facilitate the transmission of the depth packet.

The re-transmission determination unit generates the re-transmission request according to a re-transmission probability. The re-transmission probability for a 2D packet is determined based on the transmission status of that 2D packet and time constraints, while the re-transmission probability for a depth packet is calculated based on the transmission status and time constraints of that depth packet and of the corresponding 2D packet. Generally speaking, the re-transmission of a packet would occur when there is a negative feedback about the packet, such as a NACK is received or a timeout of receiving the acknowledgement about the packet has been observed. For a 2D packet, the probability of the re-transmission $P_{2D}$ is correlated with the probability of the retransmitted packet arriving at the receiver successfully and within the time constraint, i.e. received before the deadline for playback. Thus, factors such as channel conditions, the remaining time before the deadline may be taken into account. For a depth packet, except for the factors that are considered for the calculation of $P_{2D}$, the transmission status of the corresponding 2D packet is also used as an input for the determination of the probability of retransmitting a depth packet, $P_d$. If the corresponding 2D packet has a positive feedback (e.g. an ACK is received), then the re-transmission probability would be high and vice versa. In other words, the probability to re-transmit the depth packet $P_d$ is related to and increases/decreases together with the probability that the corresponding 2D packet is received successfully.

Figure 3:
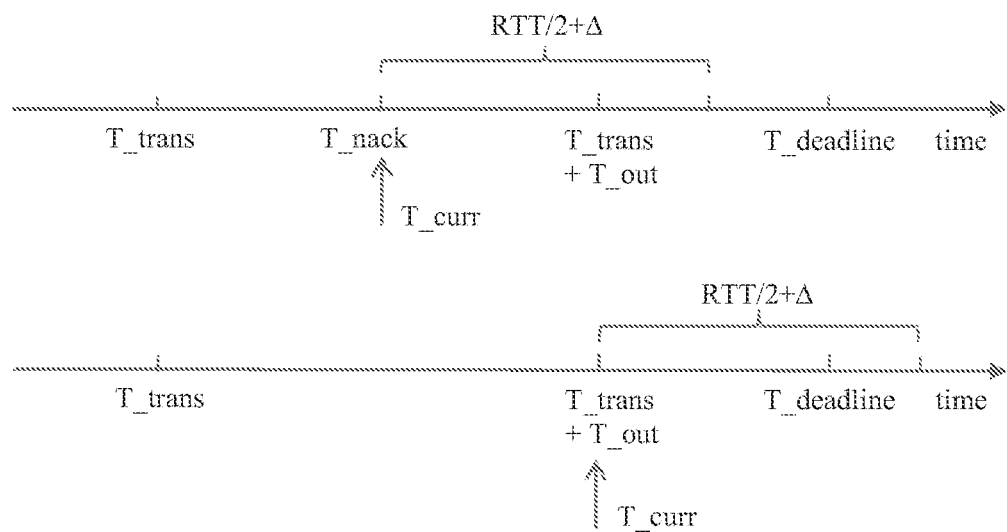
FIG. 3 illustrates relationships among various time parameters/quantities in one embodiment of the present invention.

Further, different negative feedbacks can also have different impact on the determination of $P_d$. For example, as can be seen in FIG. 3, when the NACK signal is received, there is higher chance for the retransmitted packet to arrive at the receiver than that when a timeout is observed since there is more time left before the deadline for playback. In this case, a higher $P_d$ is assigned when the NACK signal is received, than when a timeout is observed.

Figure 2:
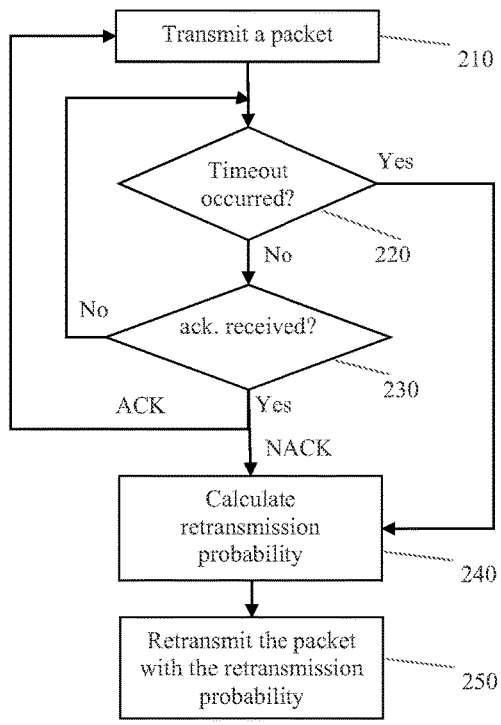
FIG. 2 shows an exemplary process of controlling errors in the 3D video transmission according to one embodiment of the present invention.

FIG. 2 illustrates the process of controlling errors in the 3D video transmission. Transmitting 2D packets and transmitting depth packets share the same major steps as shown in FIG. 2. In step 210, a 2D (or depth) packet is transmitted. A determination is made at step 220 as to whether a timeout has occurred. If yes, the process moves on to step 240 for calculation of the re-transmission probability; otherwise, step 230 checks if an acknowledgement for the sent 2D (or depth) packet has been received. If no acknowledgement has been received, the process keeps checking for timeout in step 220. If an ACK signal is received, the process moves back to step 210 for the normal transmission of a new packet. If a NACK signal is received, the process moves onto step 240 to calculate the re-transmission probability for the 2D (or depth) packet; and step 250 retransmits the packet with the calculated re-transmission probability.

In ARQ schemes, one of the important parameters is the number of re-transmissions, which specifies the maximum number of re-transmission attempts taken for a single packet delivery. If the number of re-transmissions is reached, the packet is discarded. In most of wireless network technologies, the number of re-transmissions is fixed to a default value, computed to provide to a certain radio link bit-error-rate (BER) improvement tuned to an average case, e.g. to compensate typical levels of signal fading and interference for predefined packet sizes. It is clear that the cooperative ARQ of the present invention achieves an adaptive and a non-fixed number of re-transmissions. The number of re-transmissions of a packet is determined by the re-transmission probability, which is further determined by the channel condition, the remaining time for re-transmission, and the transmission status of the corresponding 2D packet (for depth packet) etc. In situations when there is enough time and high chance for the re-transmission to succeed, multiple re-transmissions may occur, while in situations when the chances are small, only one or no re-transmission may be proper. In this way, the network connect is utilized more efficiently than the fixed number of re-transmission.

In the following, one embodiment of the present invention is described. Again, 2D-plus-Depth is used as an example 3D format, which comprises a 2D video and a depth map sequence. The same principle applies to other formats that have been mentioned before.

Notations

T_deadline denotes a deadline for each packet to arrive at the receiver in order to achieve continuous playback of the transmitted video or other time-sensitive content.

T_out denotes timeout, which specifies periods of time being allowed to elapse before an acknowledgment is to be received.

T_curr denotes the current time.

T_trans denotes the time when a packet is being transmitted.

T_ack(T_nack) denotes the arrival time of an ACK (NACK) signal at the sender.

RTT denotes the round-trip time, which is a period of time for a sent signal to arrive at the receiver plus the time for an acknowledgment of that signal to be received at the sender. RTT can be calculated in many ways. In one embodiment, the RTT for every signal which has acknowledgement is recorded. The overall RTT is then updated as follows upon the arrival of a new acknowledgement of a signal.

$$RTT = \alpha \times RTT\_curr + (1-\alpha) \times RTT\_prev$$

where RTT_curr is the RTT of the latest acknowledged signal; RTT_prev is the overall average RTT before the receipt of the latest acknowledgement; and $\alpha$ is a parameter that adjusts the weight that is put on the latest RTT when updating the overall RTT. An example value of $\alpha$ is 0.1.

ARQ for 2D data

The normal transmission unit transmits packets of the 2D video one by one. The acknowledgement receiving unit receives the feedback signals, such as ACK or NACK, from the receiver. The re-transmission determination unit determines whether re-transmission is needed or not. If needed, such as when a negative feedback NACK is received or no feedback is received before the timeout occurs, it makes a request to the re-transmission unit. The re-transmission probability is determined as follows and summarized in Table I:

1) If a NACK signal of a 2D packet is received, and T_deadline−T_curr≥RTT/2+$\Delta$ (see FIG. 3), a re-transmission request is sent to the re-transmission unit. In other words, when a negative feedback of the 2D packet is received, the re-transmission determination unit will calculate the remaining time before the deadline, i.e. T_deadline−T_curr. If the remaining time is long enough to transmit a packet, then a re-transmission request is sent to the re-transmission unit with probability $p_0$. The parameter $\Delta$ can take a value such as $\sigma_{RTT}/2$, wherein $\sigma_{RTT}$ is the standard deviation of the RTT.

2) If a NACK signal of a 2D packet is received, and T_deadline−T_curr<RTT/2+$\Delta$, then a re-transmission request is sent to the re-transmission unit with a probability $p_1$ and $p_1<p_0$.

3) If a timeout of a 2D packet occurs (i.e. T_curr=T_trans+T_out), and T_deadline−T_curr≥RTT/2+$\Delta$, then a re-transmission request is sent to the re-transmission unit with probability $p_0$.

4) If timeout of a 2D packet occurs (i.e. T_curr=T_trans+T_out), and T_deadline−T_curr<RTT/2+$\Delta$ (see FIG. 3), then a re-transmission request is sent to the re-transmission unit with a probability $p_1$ and $p_1<p_0$.

The re-transmission unit transmits the required packet when receiving the request.

TABLE 1

2D packet re-transmission probability ($p_1 <$ $p_0$, in one embodiment $p_0 = 1$)

| Conditions | | | Results |
|---|---|---|---|
| 2D NACK received | 2D timeout occurs | T_deadline − T_curr ≥ RTT/2 + $\Delta$ | Re-transmission probability |
| Yes | — | Yes | $p_0$ |
| Yes | — | No | $p_1$ |
| — | Yes | Yes | $p_0$ |
| — | Yes | No | $p_1$ |

ARQ for Depth Data

The re-transmission determination unit for depth data is slightly different from that for 2D data. In comparison with ARQ for 2D data, this unit utilizes additional information on the corresponding 2D packet transmission when making re-transmission decision. The re-transmission is determined as follows and summarized in Table II. The following applies when a NACK signal of a depth packet is received or a timeout of a depth packet occurs (i.e. T_curr=T_trans+T_out).

1) If the ACK signal of the corresponding 2D packet has been received, then send a re-transmission request to the re-transmission unit with probability $q_0$ when T_deadline−T_curr≥RTT/2+$\Delta$ or equivalently, T_curr≤T_deadline−RTT/2−$\Delta$, and send a re-transmission request to the re-transmission unit with probability $q_1$ when T_deadline−T_nack<RTT/2+$\Delta$. In one embodiment, $q_1<q_0$. Similar to the case for 2D video packet, the parameter $\Delta$ can take a value such as $\sigma_{RTT}/2$, wherein $\sigma_{RTT}$ is the standard deviation of the RTT. Note that here and in the following scenarios, T_curr is treated the same as T_nack since the decision is made upon NACK signal is received, that is T_curr≈T_nack.

2) If no ACK/NACK signal of the corresponding 2D packet has been received and timeout of the corresponding 2D packet has not occurred, then send a re-transmission request to the re-transmission unit with probability $q_2$ when T_deadline−T_nack≥RTT/2+$\Delta$, or equivalently T_curr≤T_deadline−RTT/2−$\Delta$, and send a re-transmission request to the re-transmission unit with probability $q_3$ when T_deadline−T_nack<RTT/2+$\Delta$. In one embodiment, $q_3<q_2$.

3) If, for the corresponding 2D packet, a NACK signal is received or a timeout has occurred, and T_nack (or T_timeout)≤T_deadline−RTT/2−Δ (for the corresponding 2D packet), then send a re-transmission request to the re-transmission unit with a probability $q_4$ when T_deadline−T_nack≥RTT/2+Δ (for the depth packet), or equivalently T_curr≤T_deadline−RTT/2−Δ, and send a re-transmission request to the re-transmission unit with a probability $q_5$ when T_deadline−T_nack<RTT/2+Δ. In one embodiment, $q_5<q_4$. T_timeout denotes the time of the recent timeout of the corresponding 2D video packet that occurred.

4) If, for the corresponding 2D packet, a NACK signal is received or a timeout has occurred, and T_nack (or T_timeout)>T_deadline−RTT/2−Δ (for the corresponding 2D packet), then send a re-transmission request to the re-transmission unit with a probability $q_6$ when T_deadline−T_nack≥RTT/2+α (for the depth packet), or equivalently T_curr≤T_deadline−RTT/2−Δ, and send a re-transmission request to the re-transmission unit with a probability $q_7$ when T_deadline−T_nack<RTT/2+Δ. In one embodiment, $q_7<q_6$. T_timeout denotes the time of the recent timeout of the corresponding 2D video packet that occurred.

5) In the above scenarios 1)-4), we assume T_curr<T_deadline. When T_curr>T_deadline, no re-transmission request is sent.

In one implementation, $q_0$, $q_2$, $q_4$ are set to be greater than 0.7, while $q_1$, $q_3$ $q_5$ are less than 0.3. $q_7$ could be set to 0. In another embodiment, $q_0>q_2$, $q_4$, $q_6$.

TABLE 2

Depth packet re-transmission probability

| | Conditions | | | | | |
|---|---|---|---|---|---|---|
| DepthPacket | | | Corresponding 2DPacket | | | |
| Depth NACK received or timeout occurs | T_curr ≤ T_deadline − RTT/2− Δ (Depth) | T_curr ≤ T_deadline | Corresponding 2D ACK received | Corresponding 2D NACK received or timeout has occurred | T_nack(or T_timeout) ≤ T_deadline − RTT/2− Δ (Corresponding 2D) | Results Re-transmission probability |
| Yes | Yes | — | Yes | — | — | $q_0$ |
| Yes | No | Yes | Yes | — | — | $q_1$ |
| Yes | Yes | — | No | No | — | $q_2$ |
| Yes | No | Yes | No | No | — | $q_3$ |
| Yes | Yes | — | No | Yes | Yes | $q_4$ |
| Yes | No | Yes | No | Yes | Yes | $q_5$ |
| Yes | Yes | — | No | Yes | No | $q_6$ |
| Yes | No | Yes | No | Yes | No | $q_7$ |
| — | — | No | — | — | — | 0 |

In a different embodiment, the above probability for re-transmitting 2D and depth packet, i.e. $P_{2D}$ and $P_d$, may be calculated as a function of the remaining time for re-transmission (T_deadline−T_curr) and the threshold RTT/2+Δ. For example, the function may allow the $P_{2D}$ decrease as (T_deadline−T_curr)−(RTT/2+Δ) decreases. Thus, the probabilities $p_0$, $p_1$, $q_0$~$q_7$ would be different for different packets.

Although the present invention is described in the context of the 3D video transmission, the same principles apply to any data transmission wherein the data comprises two or more interrelated components/files and the packets in each of the components/files have one to one correspondence.

It is further to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

Although preferred embodiments of the present invention have been described in detail herein, it is to be understood that this invention is not limited to these embodiments, and that other modifications and variations may be effected by one skilled in the art without departing from the scope of the invention as defined by the appended claims.

The invention claimed is:

1. A method for controlling errors during data transmission, wherein said data comprise two interrelated components, said method comprising:
transmitting a first packet of a first component and a second packet of a second component of said data separately;
determining a re-transmission probability for said second packet based on a transmission status of said first packet; and
re-transmitting said second packet according to said re-transmission probability for said second packet, wherein said data is a 3D video sequence and wherein said 3D video sequence comprises a 2D video component and a depth map component.

2. The method of claim 1, further comprising:
determining a re-transmission probability for said first packet based on the transmission status of said first packet and a time constraint of said first packet; and re-transmitting -said first packet with said re-transmission probability for said first packet.

3. The method of claim 1, wherein said data is a 3D video sequence and wherein said 3D video sequence comprises a left view component and a right view component.

4. The method of claim 1, wherein said re-transmission probability for said second packet is further determined based on a time constraint of said second packet.

5. The method of claim 4, wherein said time constraint comprises receiving said second packet before a deadline.

6. The method of claim 1, wherein said transmission status of said first packet comprises at least one of an acknowledgement (ACK) signal of said first packet, a negative acknowledgement (NACK) signal of said first packet, and a timeout for receiving acknowledgement for said first packet.

7. The method of claim 6, wherein said probability of re-transmission for said second packet is higher when said transmission status of said first packet is an acknowledgement (ACK) signal, than that when said transmission status of said first packet is one of a negative acknowledgement (NACK) signal and a timeout.

8. An apparatus for controlling errors during data transmission, wherein said data comprise two interrelated components, said method comprising:
   a normal transmission unit for transmitting a first packet of a first component and a second packet of a second component of said data separately;
   a re-transmission determination unit for generating a re-transmission request for said second packet based on a transmission status of said first packet; and
   a re-transmission unit for re-transmitting said second packet upon receiving said re-transmission request, wherein said data is a 3D video sequence and wherein said 3D video sequence comprises a 2D video component and a depth map component.

9. The apparatus of claim 8, wherein said re-transmission determination unit generates said re-transmission request for said second packet according to a first probability, and wherein said first probability is calculated based on said transmission status of said first packet.

10. The apparatus of claim 8, wherein said re-transmission determination unit generates a re-transmission request for said first packet based on a transmission status and a time constraint of said first packet; and said re-transmitting unit re-transmits said first packet upon receiving said re-transmission request for said first packet.

11. The apparatus of claim 10, wherein said re-transmission determination unit generates said re-transmission request for said first packet according to a second probability, and wherein said second probability is calculated based on said transmission status and said time constraint of said first packet.

12. The apparatus of claim 8, wherein said data is a 3D video sequence and wherein said 3D video sequence comprises a left view component and a right view component.

13. The apparatus of claim 9, wherein said first probability is further determined based on a time constraint of said second packet.

14. The apparatus of claim 13, wherein said time constraint comprises receiving said second packet before a deadline.

15. The apparatus of claim 9, wherein said transmission status of said first packet comprises at least one of an acknowledgement (ACK.) signal of said first packet, a negative acknowledgement (NACK) signal of said first packet, and a timeout for receiving acknowledgement for said first packet.

16. The apparatus of claim 15, wherein said first probability for said second packet is higher when said transmission status of said first packet is an acknowledgement (ACK) signal, than that when said transmission status of said first packet is one of a negative acknowledgement (NACK) signal and a timeout.

* * * * *